(12) United States Patent
Sugita et al.

(10) Patent No.: US 11,144,757 B2
(45) Date of Patent: Oct. 12, 2021

(54) INFORMATION PROCESSING SYSTEM, TERMINAL APPARATUS, CLIENT APPARATUS, CONTROL METHOD THEREOF, AND STORAGE MEDIUM

(71) Applicant: CANON KABUSHIKI KAISHA, Tokyo (JP)

(72) Inventors: Norio Sugita, Yokohama (JP); Ikufumi Moriya, Funabashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/747,647

(22) Filed: Jan. 21, 2020

(65) Prior Publication Data

US 2020/0242356 A1    Jul. 30, 2020

(30) Foreign Application Priority Data

Jan. 30, 2019  (JP) .............................. JP2019-014482

(51) Int. Cl.
| | |
|---|---|
| *G06K 9/00* | (2006.01) |
| *G06N 20/00* | (2019.01) |
| *H04L 29/06* | (2006.01) |
| *G06N 5/04* | (2006.01) |

(52) U.S. Cl.
CPC .......... *G06K 9/00624* (2013.01); *G06N 5/04* (2013.01); *G06N 20/00* (2019.01); *H04L 67/42* (2013.01)

(58) Field of Classification Search
CPC .......... G06K 9/00624; G06K 9/00664; G06K 9/6262; G06K 9/6263; G06K 9/6264; G06K 2209/23; G06N 20/00; G06N 20/10; G06N 20/20; G06N 5/04; H04L 67/04; H04L 67/42; H04L 67/1002; G06F 16/50; G06F 30/27
See application file for complete search history.

(56) References Cited

U.S. PATENT DOCUMENTS

| | | | | |
|---|---|---|---|---|
| 9,940,576 B1 * | 4/2018 | Dey | ........................ | H04L 63/20 |
| 10,140,553 B1 * | 11/2018 | Vasisht | ................ | G06N 3/0454 |
| 10,255,549 B2 * | 4/2019 | Dey | ........................ | G06N 3/08 |
| 10,311,336 B1 * | 6/2019 | Kim | .................. | G06K 9/00805 |

(Continued)

FOREIGN PATENT DOCUMENTS

| | | | |
|---|---|---|---|
| CN | 106170800 A | * 11/2016 | ............. G06N 3/084 |
| JP | 2014-186631 A | 10/2014 | |

(Continued)

*Primary Examiner* — Kostas J Katsikis
(74) *Attorney, Agent, or Firm* — Cowan, Liebowitz & Latman, P.C.

(57) ABSTRACT

A first information processing apparatus acquires content, determines information included in the content using a determination model for primary determination stored in a first storage unit, and outputs a primary determination result. A second information processing apparatus receives the content transmitted from the first information processing apparatus, determines information included in the content using a determination model for secondary determination stored in a second storage unit, and outputs a secondary determination result. The first information processing apparatus decides a final determination result based on at least one of the primary determination result and the secondary determination result.

23 Claims, 13 Drawing Sheets

(56) References Cited

U.S. PATENT DOCUMENTS

| | | | |
|---|---|---|---|
| 10,332,245 B1* | 6/2019 | Price | G06N 3/0454 |
| 10,635,940 B1* | 4/2020 | Ho | G06N 3/0454 |
| 2008/0312904 A1* | 12/2008 | Balchandran | G06F 40/216 |
| | | | 704/9 |
| 2008/0312906 A1* | 12/2008 | Balchandran | G06F 16/35 |
| | | | 704/9 |
| 2009/0141986 A1* | 6/2009 | Boncyk | G06Q 30/0267 |
| | | | 382/209 |
| 2011/0211760 A1* | 9/2011 | Boncyk | H04L 67/02 |
| | | | 382/190 |
| 2012/0215727 A1* | 8/2012 | Malik | G06N 5/00 |
| | | | 706/12 |
| 2012/0230548 A1* | 9/2012 | Caiman | G06K 9/00671 |
| | | | 382/104 |
| 2012/0278275 A1* | 11/2012 | Danciu | G06Q 10/06 |
| | | | 706/59 |
| 2013/0070986 A1* | 3/2013 | Peleg | G06K 9/6254 |
| | | | 382/128 |
| 2013/0261880 A1* | 10/2013 | Cho | G06F 17/00 |
| | | | 701/32.4 |
| 2014/0266803 A1* | 9/2014 | Bulan | G06K 9/00785 |
| | | | 340/932.2 |
| 2015/0019204 A1* | 1/2015 | Simard | G06F 40/242 |
| | | | 704/9 |
| 2015/0036919 A1* | 2/2015 | Bourdev | G06N 20/00 |
| | | | 382/156 |
| 2015/0117783 A1* | 4/2015 | Lin | G06T 11/60 |
| | | | 382/195 |
| 2015/0242708 A1* | 8/2015 | Duan | G06K 9/4642 |
| | | | 382/159 |
| 2015/0248586 A1* | 9/2015 | Gaidon | G06K 9/00711 |
| | | | 382/103 |
| 2015/0310365 A1* | 10/2015 | Li | G06K 9/00771 |
| | | | 705/7.38 |
| 2016/0259994 A1* | 9/2016 | Ravindran | G06N 3/08 |
| 2017/0083772 A1* | 3/2017 | Kim | G06K 9/00791 |
| 2017/0083874 A1* | 3/2017 | Hoover | G06Q 10/06375 |
| 2017/0200092 A1* | 7/2017 | Kisilev | G10L 15/063 |
| 2017/0228616 A1* | 8/2017 | Tasdizen | G06K 9/00664 |
| 2017/0294118 A1* | 10/2017 | Chen | G01V 5/0016 |
| 2018/0218258 A1* | 8/2018 | Dey | G06K 9/6263 |
| 2018/0253866 A1* | 9/2018 | Jain | G06N 7/005 |
| 2018/0373979 A1* | 12/2018 | Wang | G06K 9/00671 |
| 2019/0034822 A1* | 1/2019 | Farre Guiu | G06K 9/00718 |
| 2019/0042574 A1* | 2/2019 | Kim | G06K 9/6254 |
| 2019/0043172 A1* | 2/2019 | Chui | G06K 9/00201 |
| 2019/0073798 A1* | 3/2019 | Du | H04L 67/1002 |
| 2019/0095877 A1* | 3/2019 | Li | G06Q 10/20 |
| 2019/0132520 A1* | 5/2019 | Gupta | H04N 5/232127 |
| 2019/0220692 A1* | 7/2019 | Wu | G06K 9/628 |
| 2019/0325259 A1* | 10/2019 | Murphy | G06K 9/6259 |
| 2019/0370606 A1* | 12/2019 | Kehl | G06T 7/70 |
| 2020/0005122 A1* | 1/2020 | Fan | G06K 9/6262 |
| 2020/0019165 A1* | 1/2020 | Levandowski | G08G 1/096725 |
| 2020/0019419 A1* | 1/2020 | Yada | G06F 16/9535 |
| 2020/0042799 A1* | 2/2020 | Huang | G06K 9/00785 |
| 2020/0050901 A1* | 2/2020 | Kirchner | G06K 9/6292 |
| 2020/0074239 A1* | 3/2020 | Park | G06K 9/6262 |
| 2020/0074243 A1* | 3/2020 | Gu | G06K 9/623 |
| 2020/0090314 A1* | 3/2020 | Mayr | G06N 20/00 |
| 2020/0104646 A1* | 4/2020 | Eno | G06K 9/3241 |
| 2020/0117991 A1* | 4/2020 | Suzuki | G06K 9/628 |
| 2020/0151899 A1* | 5/2020 | Suzuki | G06K 9/6262 |
| 2020/0184623 A1* | 6/2020 | Price | G06N 3/02 |
| 2020/0242356 A1* | 7/2020 | Sugita | H04L 67/04 |
| 2020/0311120 A1* | 10/2020 | Zhao | G06F 16/432 |
| 2020/0349466 A1* | 11/2020 | Hoogerwerf | G06N 3/08 |
| 2020/0394762 A1* | 12/2020 | Chui | G06T 5/002 |

FOREIGN PATENT DOCUMENTS

| | | | | |
|---|---|---|---|---|
| JP | 2014-229124 A | 12/2014 | | |
| WO | WO-2012151198 A1 * | 11/2012 | | G06N 20/00 |
| WO | WO-2017132032 A1 * | 8/2017 | | G06Q 10/04 |
| WO | WO-2017156791 A1 * | 9/2017 | | G06N 5/043 |

* cited by examiner

FIG. 7

| CONTENT NAME | SUBJECT DETERMINATION RESULT | DETERMINATION SCORE | |
|---|---|---|---|
| IMG_0001 | TRAIN | 98 | ~701 |
| IMG_0002 | AUTOMOBILE | 60 | ~702 |
| IMG_0003 | MOTORBIKE | 37 | ~703 |
| IMG_0004 | BUS | 72 | ~704 |
| IMG_0005 | BICYCLE | 55 | ~705 |

FIG. 8

| CONTENT NAME | SUBJECT DETERMINATION RESULT | DETERMINATION SCORE | |
|---|---|---|---|
| IMG_0001 | TRAIN | 98 | |
| IMG_0002 | AUTOMOBILE | 60 | |
| IMG_0003 | BICYCLE | 85 | ~801 |
| IMG_0004 | BUS | 72 | |
| IMG_0005 | BICYCLE | 55 | |

FIG. 9

| CONTENT NAME | PRIMARY DETERMINATION RESULT SUBJECT | PRIMARY DETERMINATION RESULT DETERMINATION SCORE | SECONDARY DETERMINATION RESULT SUBJECT | SECONDARY DETERMINATION RESULT DETERMINATION SCORE |
|---|---|---|---|---|
| IMG_0101 | AUTOMOBILE | 92 | AUTOMOBILE | 99 |
| IMG_0102 | AUTOMOBILE | 87 | AUTOMOBILE | 97 |
| IMG_0103 | BUS | 65 | BUS | 85 |
| IMG_0104 | BICYCLE | 82 | MOTORBIKE | 90 |
| IMG_0105 | MOTORBIKE | 55 | BICYCLE | 87 |

FIG. 10

| CONTENT NAME | PRIMARY DETERMINATION RESULT SUBJECT | PRIMARY DETERMINATION RESULT DETERMINATION SCORE | SECONDARY DETERMINATION RESULT SUBJECT | SECONDARY DETERMINATION RESULT DETERMINATION SCORE |
|---|---|---|---|---|
| IMG_0101 | AUTOMOBILE | 92 | AUTOMOBILE | 99 |
| IMG_0102 | AUTOMOBILE | 87 | AUTOMOBILE | 97 |
| IMG_0103 | BUS | 65 | BUS | 85 |
| IMG_0104 | BICYCLE | 82 | MOTORBIKE | 90 |
| IMG_0105 | MOTORBIKE | 55 | BICYCLE | 87 |

1001

INFORMATION PROCESSING SYSTEM, TERMINAL APPARATUS, CLIENT APPARATUS, CONTROL METHOD THEREOF, AND STORAGE MEDIUM

BACKGROUND OF THE INVENTION

Field of the Invention

The present invention relates to an information processing system for automatically determining content desired by a user.

Description of the Related Art

In recent years, in order to determine a subject, a scene, or the like present in content such as a still image or a moving image, there have been an increasing number of cases of determination by inference processing that uses machine learning. This is creating a determination model based on a large amount of content, and causing the determination model to be stored in an information processing apparatus to thereby efficiently determine a subject or a scene present in content acquired by the information processing apparatus.

The information processing apparatus displays to a user information such as a subject, a scene, and the like included in the acquired content. Then, the user can efficiently acquire content containing a desired subject, scene, or the like by referring to the determination information, Which is the subject, scene, or the like included in the content, displayed by the information processing apparatus.

However, a determination model that could be stored in a conventional information processing apparatus had to be a limited size due to restrictions on the storage capacity, processing capability, and the like of the information processing apparatus, and it was not been possible to update the determination model based on acquired content. As a result, when an image included a characteristic subject, scene, or the like that could not be handled by the determination model stored in the information processing apparatus, the information processing apparatus was not able determine the subject, scene, or the like, and was not able to display information of an appropriate subject, scene, or the like to the user. Therefore, there were cases where the user could not acquire an image containing a desired subject, scene, or the like.

In contrast, Japanese Patent Laid-Open No. 2014-229124 proposes to use a determination model corresponding to a characteristic subject, scene, or the like, separately from a common subject, scene, or the like. Further, Japanese Patent Laid-Open No. 2014-186631 proposes that each of a first information processing apparatus and a second information processing apparatus have a determination model, and that the first information processing apparatus and the second information processing apparatus perform determination in cooperation with each other.

In Japanese Patent Laid-Open No. 2014-229124, an information processing apparatus can determine content that includes a characteristic subject, scene, or the like by using a specific determination model corresponding to the characteristic subject, scene, or the like. However, in Japanese Patent Laid-Open No. 2014-229124, although a specific determination model that matches a characteristic subject, scene, or the like can be used, there is no means for updating a determination model stored in an information processing apparatus in accordance with the accuracy of a determination result. Further, in an environment in which the processing capability and the storage capacity of the information processing apparatus are restricted, it is impossible to have a highly accurate determination model.

In contrast, in Japanese Patent Laid-Open No. 2014-186631, even in an environment in which a first information processing apparatus requiring rapid determination is restricted, a second information processing apparatus with less restriction can have a highly accurate determination model. Therefore, the first information processing apparatus can quickly perform a determination, and then the second information processing apparatus can perform a determination with higher accuracy. However, for the determination model of the first processing apparatus that performs the rapid determination, there is no means for updating the determination model in order to improve the accuracy of a determination result.

For these reasons, conventional information processing apparatuses have not necessarily been capable of determining content that includes a subject, scene, or the like desired by a user.

SUMMARY OF THE INVENTION

The present invention has been made in view of the above-mentioned problems, and provides an information processing system capable of appropriately determining content that includes a subject, a scene, or the like desired by a user.

According to a first aspect of the present invention, there is provided an information processing system in which a first information processing apparatus and a second information processing apparatus are configured to be communicably connected to each other in a wired or wireless manner, wherein the first information processing apparatus comprises: at least one processor or circuit configured to function as a content acquisition unit configured to acquire content; a first storage unit configured to store a determination model for primary determination for determining details of the content; a first determination unit configured to determine information included in the content using the determination model for primary determination, and output a primary determination result; a first transmission unit configured to transmit the content to the second information processing apparatus; and a decision unit configured to receive a secondary determination result from the second information processing apparatus and decide a final determination result based on at least one of the primary determination result and the secondary determination result, and the second information processing apparatus comprises: at least one processor or circuit configured to function as a content reception unit configured to receive the content transmitted from the first information processing apparatus; a second storage unit configured to store a determination model for secondary determination for determining details of the content; a second determination unit configured to determine information included in the content using the determination model for secondary determination, and output a secondary determination result; and a second transmission unit configured to transmit the secondary determination result to the first information processing apparatus.

According to a second aspect of the present invention, there is provided a terminal apparatus used in an information processing system in which the terminal apparatus and a server apparatus are configured to be communicably connected to each other in a wired or wireless manner, the terminal apparatus comprising: at least one processor or circuit configured to function as a content acquisition unit configured to acquire content; a storage unit configured to store a determination model for primary determination for determining details of the content; a determination unit configured to determine information included in the content using the determination model for primary determination, and output a primary determination result; a transmission unit configured to transmit the content to the server apparatus; and a decision unit configured to receive from the server apparatus a secondary determination result in which is determined information included in the content by the server apparatus, and decide a final determination result based on at least one of the primary determination result and the secondary determination result.

According to a third aspect of the present invention, there is provided a server apparatus used in an information processing system in which a terminal apparatus and a server apparatus are configured to be communicably connected to each other in a wired or wireless manner, the server apparatus comprising: at least one processor or circuit configured to function as a content reception unit configured to receive content transmitted from the terminal apparatus; a storage unit configured to store a determination model for secondary determination for determining details of the content; a determination unit configured to determine information included in the content using the determination model for secondary determination, and output a secondary determination result; and a transmission unit configured to transmit the secondary determination result to the terminal apparatus.

According to a fourth aspect of the present invention, there is provided a method of controlling a terminal apparatus used in an information processing system in which the terminal apparatus and a server apparatus are configured to be communicably connected to each other in a wired or wireless manner; the method comprising: acquiring content; storing a determination model for primary determination for determining details of the content; determining information included in the content using the determination model for primary determination, and outputting a primary determination result; transmitting the content to the server apparatus; and receiving from the server apparatus a secondary determination result in which is determined information included in the content by the server apparatus, and deciding a final determination result based on at least one of the primary determination result and the secondary determination result.

According to a fifth aspect of the present invention, there is provided a method of controlling a server apparatus used in an information processing system in which a terminal apparatus and a server apparatus are configured to be communicably connected to each other in a wired or wireless manner, the method comprising: receiving content transmitted from the terminal apparatus; storing a determination model for secondary determination for determining details of the content; determining information included in the content using the determination model for secondary determination, and outputting a secondary determination result; and transmitting the secondary determination result to the terminal apparatus.

Further features of the present invention will become apparent from the following description of exemplary embodiments with reference to the attached drawings.

BRIEF DESCRIPTION OF THE DRAWINGS

FIG. 7 is a diagram illustrating scores of determination results.

FIG. 8 is a diagram for explaining a correction of a determination result.

FIG. 9 is a diagram illustrating a case where a primary determination result and a secondary determination result are different from each other, FIG. 10 is a diagram illustrating a case where a determination score of a primary determination is equal to or larger than a reference value, and a primary determination result and a secondary determination result are different from each other.

DESCRIPTION OF THE EMBODIMENTS

Figure 1:
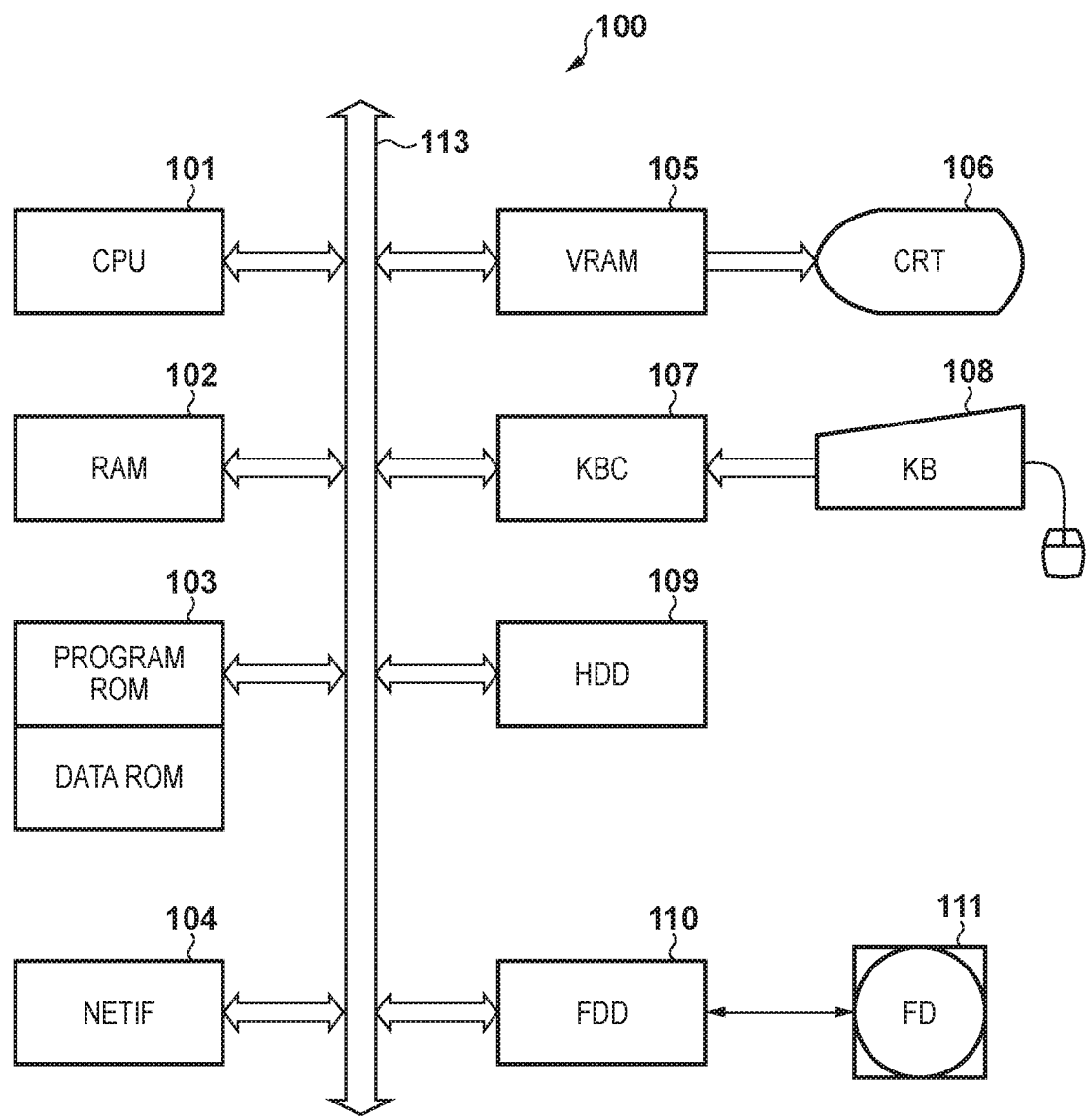
FIG. 1 is a block diagram illustrating a configuration of an information processing apparatus according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating a configuration of an information processing apparatus 100 according to a first embodiment of the present invention. In FIG. 1, a central processing unit (hereinafter, referred to as a CPU) 101 is responsible for calculation and control of an information processing apparatus. A random access memory (hereinafter, referred to as RAM) 102 functions as a main memory of the CPU 101, an area of an execution program, an execution area of the program, and a data area.

A read-only memory (hereinafter, recited as ROM) 103 stores programs which represent operation processing procedure of the CPU 101. The ROM 103 is provided with a program ROM in which base software (OS), which is a system program for performing device control of the information processing apparatus 100, is recorded, and a data ROM in which information and the like required for operating the system are recorded. Instead of the ROM 103, it is also possible to use a below-described HDD 109, a NAND flash memory, an SD card, a solid state drive (SSD), and the like.

A network interface (NETIF) 104 performs control for transferring data between information processing apparatuses via a network and diagnoses a connection status. A video RAM (VRAM) 105 loads content information, a determination result, and the like to be displayed on a CRT 106 screen for indicating the operating state of the information processing apparatus 100, which will be described later, and controls the display of the content information, the determination result, and the like.

A display apparatus (hereinafter recited as CRT) 106 such as a display displays various information. A keyboard controller (hereinafter referred to as IBC) 107 controls input signals from an external input device (hereinafter referred to as KB) 108. The KB 108 is an apparatus for accepting operations performed by a user, and for example, a keyboard and a pointing device such as a mouse, or a touch panel display is used.

A hard disk drive (hereinafter referred to as an HDD) 109 is used for storing application programs and various data. Instead of an HDD, a NAND flash memory, an SD card, a solid state drive (SSD), and the like may be used. An application program in the present embodiment is a software program (module) or the like that is for executing various processes in the present embodiment.

An external input/output apparatus (hereinafter referred to as an FDD) 110 is, for example, an apparatus for inputting/outputting removable disks such as a floppy disk drive, a CD-ROM drive, and SD cards, and is used for reading out the aforementioned application program from the medium.

The FD 111 is a magnetic recording medium (e.g., a flexible disk or an external hard disk) that is read by the FDD 110. Note that the medium is not limited to a flexible disk, and may be configured by a removable data recording apparatus (removable medium) such as an optical recording medium (e.g., a CD-ROM), a magneto-optical recording medium (e.g., an MO), or a semiconductor recording medium (e.g., an SD card). It should be noted that application programs and data to be stored in the HDD 109 can also be stored in the FDD 110 for use.

Figure 2:
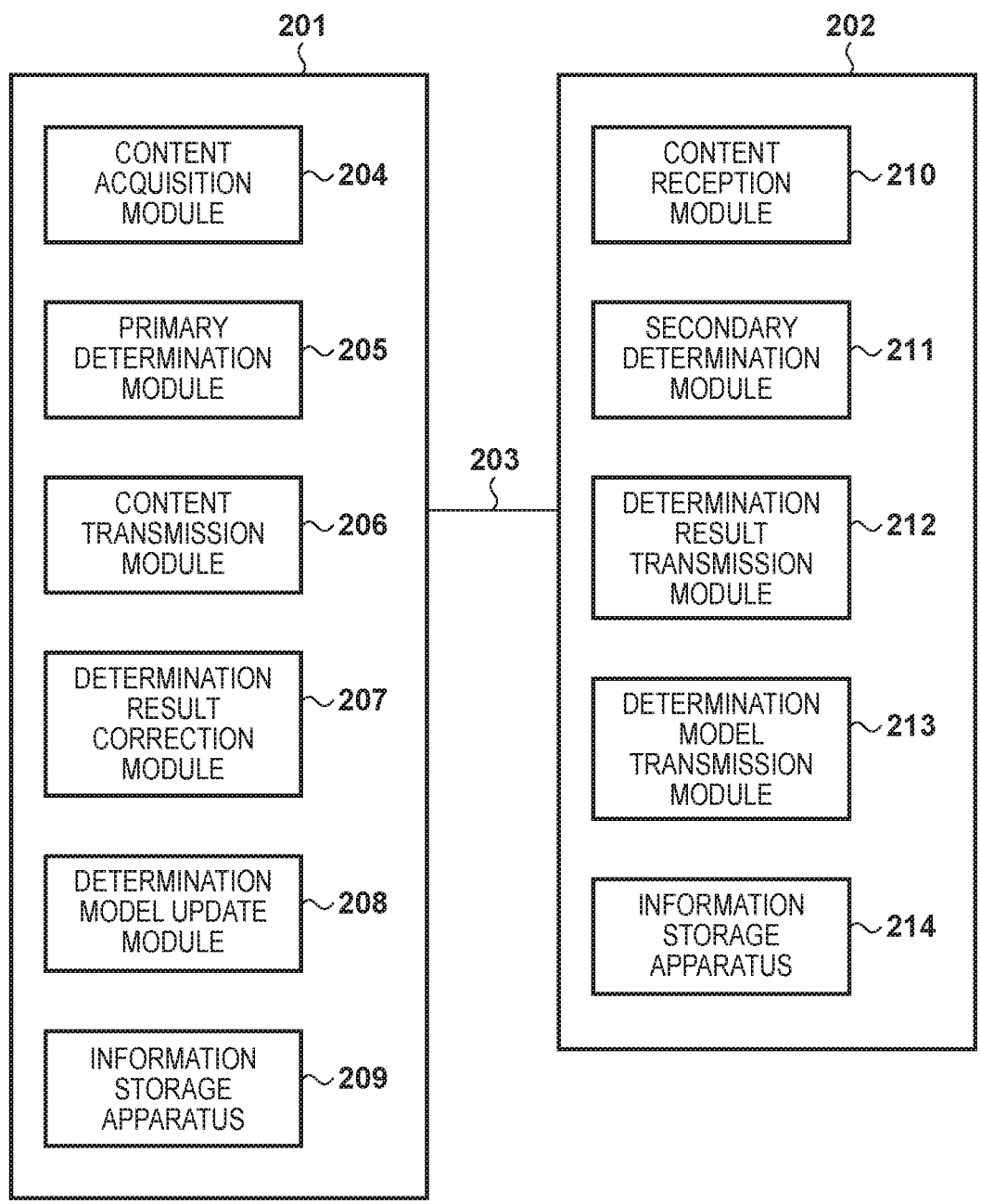
FIG. 2 is a block diagram illustrating a configuration of first and second information processing apparatuses according to a first embodiment of the present invention.

FIG. 2 is a block diagram for describing a configuration of application programs for realizing a content determination method in an information processing apparatus. The present embodiment is provided with a processing module group that operates in the information processing apparatus and a storage apparatus that stores information. The flow of control and information between each group of processing modules and storage apparatuses is described below.

The information processing system according to the present embodiment is realized by a first information processing apparatus 201, a second information processing apparatus 202, and a network 203 that connects them so as to enable wired or wireless communication. A content acquisition module 204, a primary determination module 205, a content transmission module 206, a determination result correction module 207, and a determination model update module 208 are processing modules, and the information storage apparatus 209 is a storage apparatus. These processing modules and storage apparatuses are arranged in the first information processing apparatus 201. Similarly, a content reception module 210, a secondary determination module 211, a determination result transmission module 212, and a determination model transmission module 213 are processing modules, and an information storage apparatus 214 is a storage apparatus. These processing modules and storage apparatuses are arranged in the second information processing apparatus 202.

Note that these processing modules are read from the ROM 103, the HDD 109 or the FDD 110 illustrated in FIG. 1, loaded into the RAM 102, and operate as some of an application programs or a program used by the CPU 101. Content information, a determination model, and a determination result are stored in the information storage apparatus 209 and 214 in each information processing apparatus. Note that the storage capacity of the information storage apparatus 214 of the second information processing apparatus 202 is larger than the storage capacity of the information storage apparatus 209 of the first information processing apparatus 201, and a larger scale determination model can be stored in the information storage apparatus 214. The determination model is, for example, a learning model generated by machine learning using deep learning such as a convolutional neural network (CNN).

The information processing apparatus, the processing modules therein, and an information storage apparatus operate as follows. Information and instructions that is automatically activated or are inputted by an operator from a KB 108 are input to an information processing apparatus through a KBC 107, loaded into the RAM 102 as required, and transmitted to the CPU 101. In the CPU 101, a calculation is performed. Processing modules required for the calculation and information stored in the information storage apparatus are loaded into the RAM 102 from the ROM 103, the HDD 109, the FDD 110 or the like, and are transmitted to the CPU 101. The result of the calculation by the CPU 101 is, if required, written to the information storage apparatus which is present in the RAM 102, the HDD 109, the FDD 110 or the like. At the same time, if necessary, a result calculated by the CPU 101 is displayed on the CRT 106 via the VRAM 105. Transmission between the CPU 101, the RAM 102, the ROM 103, the NETIF 104, the VRAM 105, the KBC 107, the HDD 109, and the FDD 110 is performed through a transmission bus 113.

Figure 3:
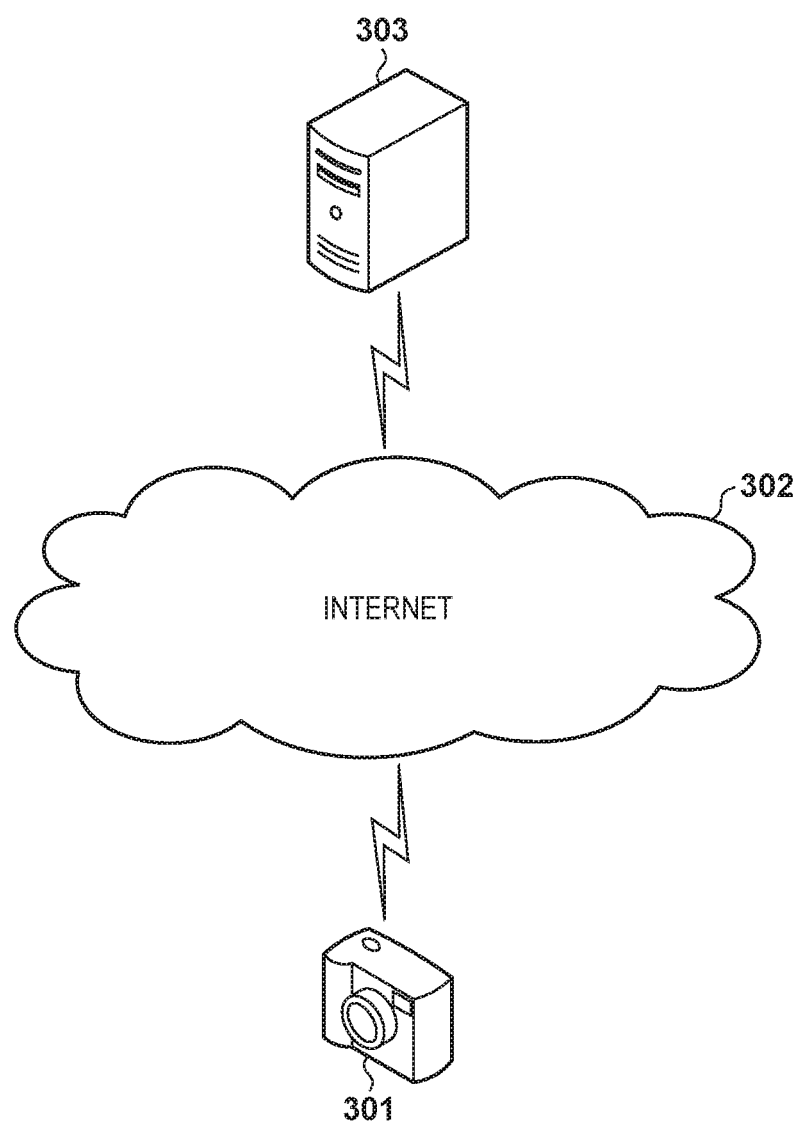
FIG. 3 is a diagram illustrating an overall configuration of an information processing system according to the first embodiment of the present invention.

FIG. 3 is a diagram illustrating an overall configuration of an information processing system according to the first embodiment. An image capturing apparatus (terminal apparatus) 301 detects an acquisition request for content such as an image or a moving image in accordance with an operation from a user, and acquires (captures) content which is an image capturing target while displaying the content which is the image capturing target. The image capturing apparatus 301 corresponds to the first information processing apparatus 201 in FIG. 2. The image capturing apparatus 301 analyzes the acquired content and determines a subject, a scene, and the like included in the content. At this time, since a subject, a scene, or the like can be determined in the image capturing apparatus 301 that stores the content, the determination result can be quickly acquired. However, since the image capturing apparatus 301 is restricted in storage capacity, processing capability, and the like, it can have only a limited determination model. Alternatively, even if the image capturing apparatus 301 has equivalent storage capacity and processing capability as the second information processing apparatus 202, the image capturing apparatus 301 can have only a determination model from the time of shipment if the image capturing apparatus 301 does not have a function of performing reinforcement learning.

The Internet 302 corresponds to the network 203 of FIG. 2. A content determination processing server 303 receives content from the image capturing apparatus 301, and determines a subject, a scene, and the like included in the content. The content determination processing server 303 corresponds to the second information processing apparatus 202 in FIG. 2. Since the content determination processing server 303 has few restrictions on storage capacity and processing capability, it is possible to have a highly accurate determination model. Further, the content determination processing server 303 can improve the determination accuracy of the determination model as needed by periodically collecting supervisory data and performing reinforcement learning. The image capturing apparatus 301 and the content determination processing server 303 transmit and receive content data via the Internet 302. The image capturing apparatus 301 acquires content in accordance with a capturing operation from a user. The determination of the subject, scene, and the like included in this content is performed by comparing the primary determination result based on the determination model held by the image capturing apparatus 301 with the secondary determination result based on the determination model of the content determination processing server 303.

Figure 4:
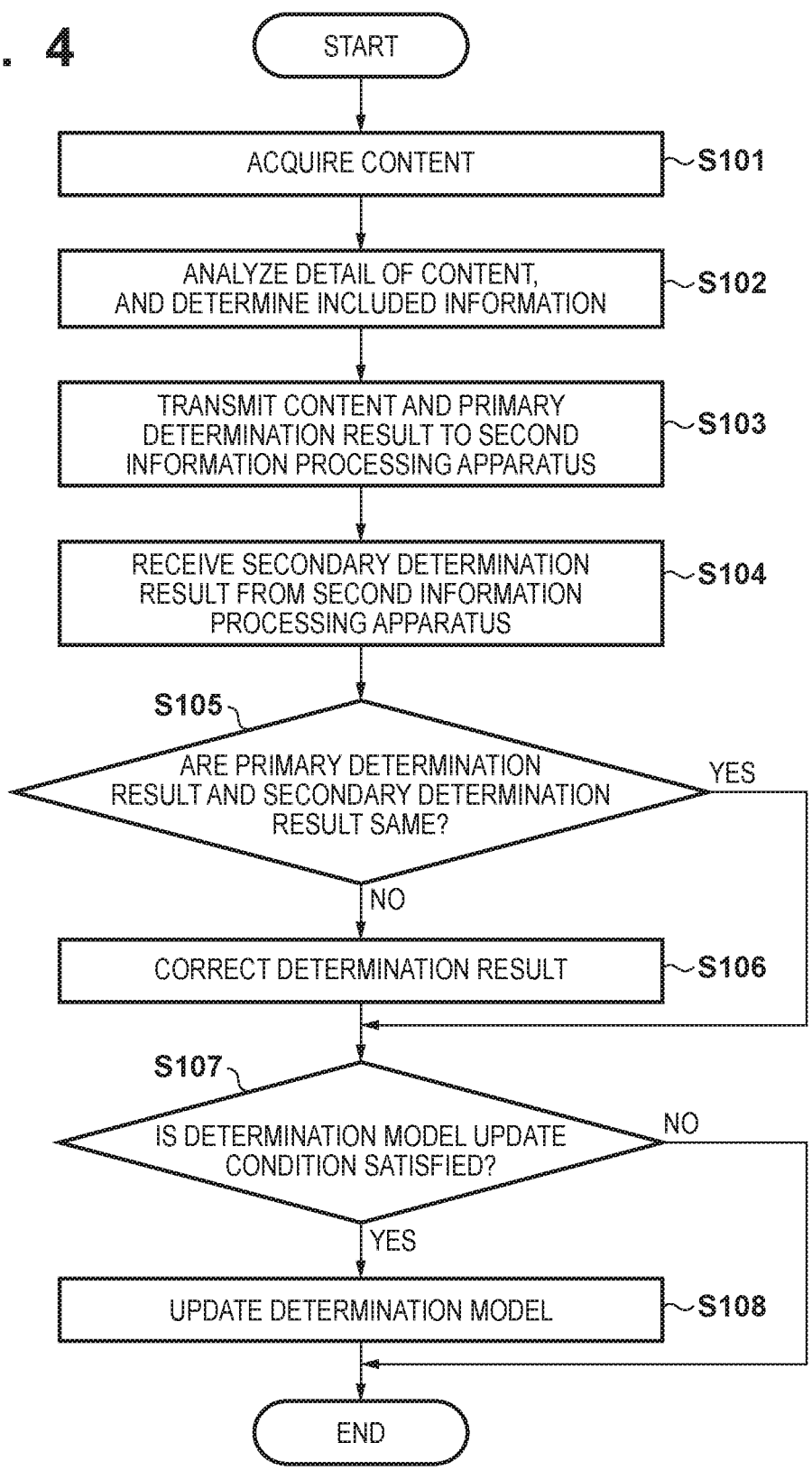
FIG. 4 is a flowchart illustrating a processing procedure of the first information processing apparatus.

Next, the processing procedure of the content determination method according to the present embodiment will be described in detail with reference to the flowcharts of FIGS. 4 and 5. FIG. 4 is a flowchart for describing a processing procedure of the first information processing apparatus 201 in the content determination method according to the present embodiment.

In step S101, the content acquisition module 204 acquires content by creating content in accordance with processing for capturing the content, or acquires stored content from the information storage apparatus 209.

In step S102, the primary determination module 205 analyzes details of the content using the determination model for primary determination, and determines information included in the content. In the case where a determination result is referred to in a duration before the determination result is corrected in later processing, the primary determination result is used.

In step S103, the content transmission module 206 transmits the content information and the primary determination result to the second information processing apparatus 202.

In step S104, the determination result correction module 207 receives a secondary determination result from the second information processing apparatus 202, and further, in step S105, the determination result correction module 207 makes a comparison as to whether or not the primary determination result and the secondary determination result are the same. When the primary determination result and the secondary determination result are the same, the primary determination result is decided as the determination result unchanged, and the process proceeds to step S107 In contrast, when the determination results are not the same, the process proceeds to step S106.

In step S106, the determination result is corrected so that the secondary determination result is adopted instead of the primary determination result.

In step S107, the determination model update module 208 determines whether or not a determination model update condition is satisfied. If the update condition is satisfied, the process proceeds to step S108, and if the update condition is not satisfied, operation of this flow ends.

In step S108, the determination model update module 208 updates the determination model, and operation of this flow ends.

Figures 5, 6:
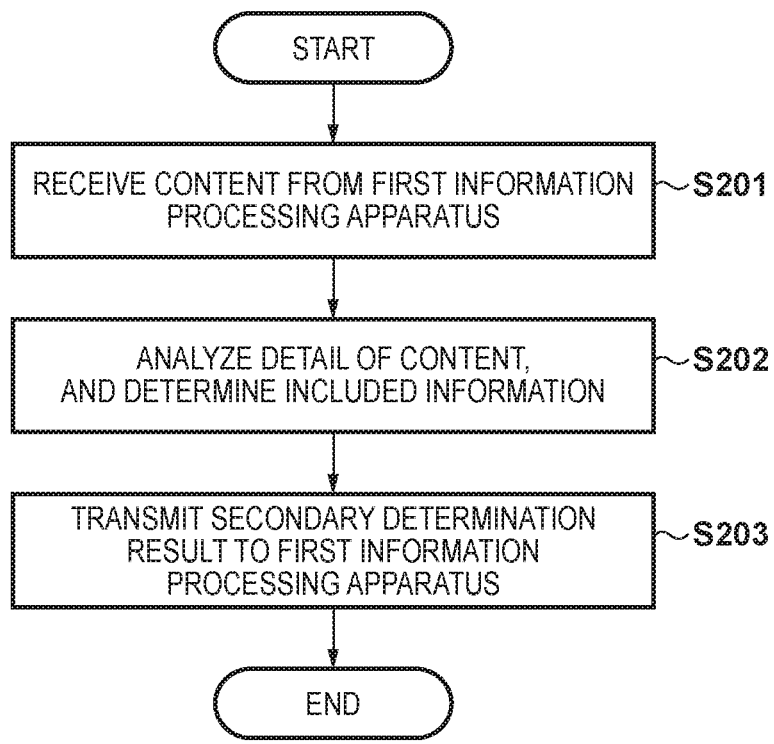
FIG. 5 is a flowchart illustrating a processing procedure of the second information processing apparatus.
FIG. 6 is a diagram illustrating transmission intervals of content in a communication environment.

FIG. 5 is a flowchart for describing a processing procedure of the second information processing apparatus in the content determination method according to the present embodiment.

In step S201, the content reception module 210 receives the content transmitted from the first information processing apparatus 201 in step S103 of FIG. 4.

In step S202, the secondary determination module 211 analyzes details of the content using the determination model for secondary determination, and determines information included in the content.

In step S203, the determination result transmission module 212 transmits the secondary determination result to the first information processing apparatus 201.

Next, description will be given regarding the content transmission module 206 that transmits the content information acquired by the first information processing apparatus 201 and the primary determination result to the second information processing apparatus 202. This corresponds to the process of step S103 in FIG. 4.

In order to improve the determination accuracy of the content information, it is desirable that the content acquired by the first information processing apparatus 201 is transmitted to the second information processing apparatus 202 every time, and a secondary determination capable of determining the content with high accuracy is performed. However, depending on the environment which means the communication environment, the performance of the information processing apparatus, the content size, and the like, there arises a problem that transmission of the content and the determination process are waited for, and the processing for the secondary determination is stagnant. Therefore, there are cases where it is better to transmit the content by a method suitable for the environment, instead of transmitting all the content to the second information processing apparatus.

FIG. 6 is a diagram for explaining an operation of the content transmission module 206 for changing an interval for transmitting content according to a communication environment. In the case of a WiFi environment, content is transmitted at 1 second intervals as illustrated by reference numeral 601, 5 second intervals as illustrated by reference numeral 602 in the case of a 4G environment, and 20 second intervals as illustrated by reference numeral 603 in the case of a 3G environment. By doing so, the secondary determination result can be acquired at a time interval suitable for the communication environment without the secondary determination process being stagnant. Although a method of changing the interval for transmitting content using the communication environment has been described, the content transmission interval may be changed according to the size of the content and the performance of the information processing apparatus.

FIG. 7 is a diagram for explaining an operation of transmitting content only when a score of a determination result is less than a reference value. Here, content acquired by the first information processing apparatus 201 is analyzed to determine a name of a main subject included therein, and the accuracy of the determination result is displayed as a determination score from 0 to 100. When a determination score with high accuracy is acquired in the primary determination of the first information processing apparatus 201, it is highly likely that the determination result is correct even if the secondary determination of the second information processing apparatus 202 is not performed. Therefore, in this case, the content is not transmitted to the second information processing apparatus 202. For example, when the determination score serving as a reference of content transmission is less than 50, since determination scores 701, 702, 704, and 705 are 50 or more, the subject determination result of the primary determination is adopted unchanged. On the other hand, for reference numeral 703, since the subject determination result is "motorbike" and the determination score is 30, which is lower than the reference determination score 50, the content is transmitted to the second information processing apparatus 202 and the secondary determination is performed.

FIG. 8 is a diagram for describing the determination result correction module. As a result of transmitting the content 703 in FIG. 7 to the second information processing apparatus 202 and performing the secondary determination, the subject determination result is "bicycle", and the determination score is 85, as indicated by 801. As a result of the subject determination by the secondary determination, because "bicycle" which is a determination result different from that of the primary determination is produced, a correction is made to have this as the final determination result. As described above, when a different determination result is produced by the secondary determination with higher accuracy, the determination result of the content is corrected. As a result, it is possible to, while adopting the result of the rapid primary determination, with respect to a result with low accuracy, later correct the determination result in accordance with a secondary determination result that has higher accuracy. Here, when the secondary determination result is different from the primary determination result, the secondary determination result is adopted unchanged, but if the determination score of the secondary determination is less than 50 which is the reference value, the determination result may be set to "unknown" or the result of the primary determination may be adopted.

Next, description is given regarding a process of, based on the results of the primary determination and the secondary determination, determining whether or not the determination model update condition is satisfied, and updating the determination model. This corresponds to the process of step S107 and step S108 in FIG. 4. When the result of the primary determination and the result of the secondary determination are different, the primary determination is often erroneous because of the difference in determination accuracy. Therefore, the result of the secondary determination is adopted as the final determination result. However, since it is necessary to improve the accuracy of the primary determination in order to perform the determination quickly and accurately, the determination model is updated so that the first information processing apparatus 201 can also perform the determination with high accuracy.

FIG. 9 is a diagram for explaining an update of a determination model in the case where the result of the primary determination and the result of the secondary determination are different from each other. In FIG. 9, five pieces of content are acquired within a certain period of time, and a subject in each of these is determined. The subject determination results 901, 902, and 903 indicate that the subject of the primary determination result and the subject of the secondary determination result are the same. In contrast, the reference numerals 904 and 905 indicate determination results for which the subject of the primary determination result and the subject of the secondary determination result differ. Here, it is assumed that all the secondary determination results are correct.

In the present embodiment, when there are error in primary determination results that exceeds a predetermined ratio (e.g., 30%) within a certain period of time, the determination model of the first information processing apparatus is updated. In the example of FIG. 9, since there is an error in 40% of the primary determination results, processing to update the determination model is performed. In this case, since there is an error in "motorbike" and "bicycle" subjects among the content acquired by the first information processing apparatus 201, a determination model for these subjects is replaced with a determination model having higher determination accuracy. In a case where it is assumed that a determination model of the first information processing apparatus 201 is a model capable of determining a vehicle such as an airplane, an automobile, a bus, a train, a motorbike, or a bicycle, the determination model is replaced with one that is specialized for automobiles, a buses, motorbikes, and bicycles and that does not include determination for a subject with a low usage frequency so as to improve the determination accuracy.

In this manner, by replacing the determination model with one corresponding to the content, it is possible to acquire a highly accurate determination result even in an environment in which the processing capability and the storage capacity of the first information processing apparatus 201 are restricted.

FIG. 10 is a diagram for describing the update of the determination model in the case where a determination score of a primary determination is equal to or larger than the reference value and the primary determination result and the secondary determination result are different from each other. In the subject determination result 1001, even though the determination score of the primary determination result exceeds 50, which is the reference value, there is a difference with the subject of the secondary determination result, and as a result, it is erroneous. In this case, since it can be considered that the primary determination model is not suitable for content determination, the determination model of the first information processing apparatus 201 is updated. As described above, when an error occurs in the determination result although the score of the primary determination result is reliable, improvement of the determination accuracy is attempted by updating the determination model used for the primal), determination.

In the present embodiment, description was given using images as content, but other content such as moving images and sounds may be used. Details of the determination have been described using the determination (subject analysis) of the subject appearing in the content, but configuration may be taken to determine a certain feature amount, such as detection (scene analysis) of a captured scene such as the sea, a mountain, hall, or the like, or an aesthetic evaluation (aesthetic analysis) of the content.

As described above, according to the first embodiment, it is possible to appropriately determine content including a subject, a scene, or the like desired by the user.

Second Embodiment

In the second embodiment, the configuration of the information processing apparatus and the configuration of the entire system are similar to those of the first embodiment illustrated in FIGS. 1 to 3. Therefore, detailed description thereof is omitted.

In the present embodiment, although this is also similar to as in the first embodiment, the determination of subject, scene, or the like included in content is performed by comparing a primary determination result in accordance with the determination model held by the image capturing apparatus 301 (first information processing apparatus 201) with a secondary determination result in accordance with the determination model of the content determination processing server 303 (second information processing apparatus 202).

For example, it is assumed that the first information processing apparatus 201 determines a subject A included in an image, and was not able to determine a subject B. In contrast, it is assumed that the second information processing apparatus 202 determines the subject B included in an image from the first information processing apparatus 201, and transmits a result of this determination to the first information processing apparatus 201. In this case, the first information processing apparatus 201 displays the determination result on the assumption that not only the subject A but also the subject B has been determined with respect to the image which is in accordance with a capturing operation by a user.

Regarding a specific subject, when the failure of determination and reception of a determination result of the second information processing apparatus 202 reaches a predetermined number of times, the first information processing apparatus 201 makes a request to the second information processing apparatus 202 to acquire a determination model for the specific subject. When a determination model acquisition request is transmitted to the second information processing apparatus 202, a used-in-update determination model is transmitted from the second information processing apparatus 202, and the determination model held by the first information processing apparatus 201 is updated based on the used-in-update determination model.

The second information processing apparatus 202 receives an image from the first information processing apparatus 201, and determines a subject, a scene, or the like included in the image. At this time, the usage frequency of the used model is stored, and the information of the usage frequency is returned to the first information processing apparatus 201 together with the determination result.

In this manner, the first information processing apparatus 201 can acquire a determination model suitable for determination of an image captured by a user. As a result, the user of the first information processing apparatus 201 can efficiently acquire an image that includes a desired subject, scene, or the like by using the first information processing apparatus 201 which has stored the updated determination model.

Figure 11:
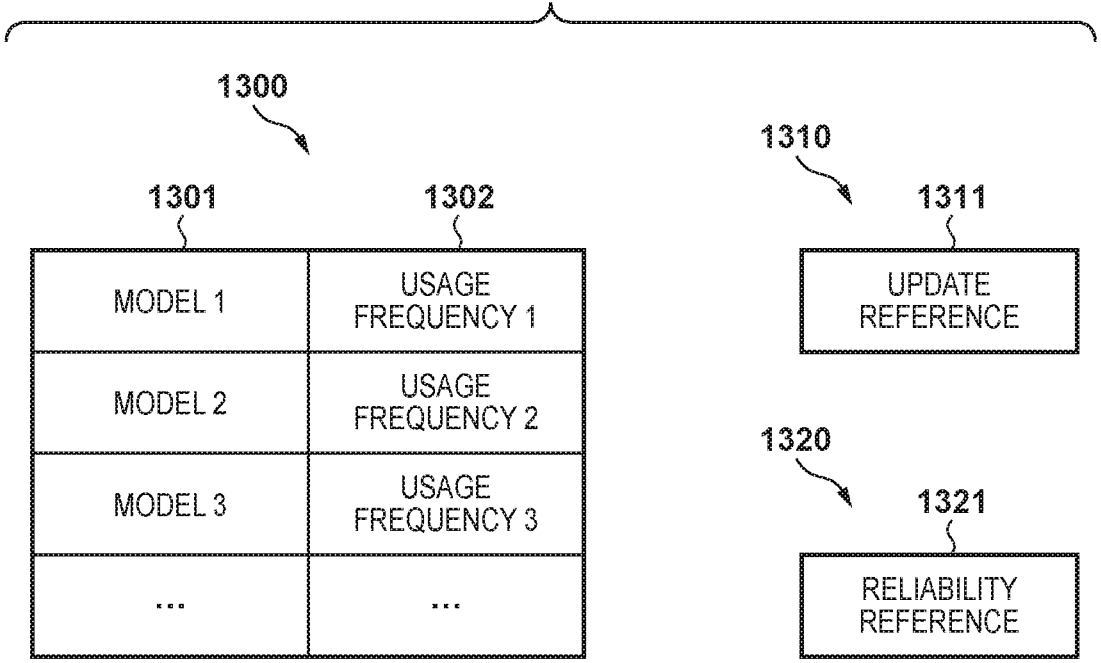
FIG. 11 is a diagram illustrating a mode of managing information of the first information processing apparatus according to a second embodiment of the present invention.

FIG. 11 is a diagram illustrating an example of a management mode for storing information managed by the first information processing apparatus 201 according to the second embodiment.

In FIG. 11, a table 1300 is a table for managing a determination model stored in the first information processing apparatus 201. Determination model information 1301 is information for determining a determination model stored in the first information processing apparatus 201. Usage frequency information 1302 is information relating to the usage frequency of each determination model of the determination model information 1301.

The table 1300 includes information on determination models originally held by the first information processing apparatus 201 and the usage frequency thereof. However, it also includes the determination model used by the second information processing apparatus 202 when having the second information processing apparatus 202 to make a determination, and information on the frequency of having the second information processing apparatus 202 to make a determination using this determination model. The first information processing apparatus 201 is provided with only determination models for determining a subject or a scene which is generally preferable as an image capturing target because of restrictions on the storage capacity, processing capability, and the like of the first information processing apparatus 201. In contrast, the second information processing apparatus 202 is provided with a plurality of determination models for determining scenes of uncommon special subjects, in addition to determination models for determining subjects and scenes that are generally preferable as image capturing targets.

A table 1310 is a table for managing an update reference for updating each determination model indicated by the determination model information 1301. The update reference information 1311 is information relating to an update reference for updating each determination model indicated by the determination model information 1301. A table 1320 is a table for managing a reliability reference of a determination result for when each determination model indicated by the determination model information 1301 made a determination for an image. The reliability reference information 1321 is information relating to a reliability reference of a determination result for when each determination model indicated by the determination model information 1301 made a determination for an image.

The first information processing apparatus 201 acquires an image and refers to the determination model information 1301 of the table 1300 when determining a subject, a scene, or the like of the image. Then, from among the determination models registered in the determination model information 1301, the determination models provided in the first information processing apparatus 201 are sequentially applied to the acquired image to determine a subject, a scene, or the like, and a result is displayed.

When the determination is not successful with only the determination models included in the first information processing apparatus 201, the first information processing apparatus 201 transmits the acquired image to the second information processing apparatus 202, and receives a determination result in accordance with the second information processing apparatus 202 and information of a determination model used therein. The first information processing apparatus 201 adds the information of a new determination model to the table 1300 if the received information of the determination model is new, and updates the usage frequency if it corresponds to an already present determination model.

The first information processing apparatus 201 acquires the value of the usage frequency information 1302 corresponding to the determination model registered in the determination model information 1301 and the value of the update reference information 1311 of the table 1310 related to the update reference. When the value of the usage frequency information 1302 reaches the value of the update reference information 1311, a used-in-update determination model for updating the determination model is acquired from the second information processing apparatus 202. Then, based on the used-in-update determination model acquired from the second information processing apparatus 202, the first information processing apparatus 201 updates the determination model that has reached a certain usage frequency.

The first information processing apparatus 201 transmits an image to the second information processing apparatus 202, and acquires a determination result from the second information processing apparatus 202. However, even if an image is intentionally not transmitted to the second information processing apparatus 202, a determination result having a high reliability may be acquired by a determination model held by the first information processing apparatus 201. In this case, the first information processing apparatus 201 acquires the value of the reliability reference information 1321 of the table 1320 as a reference for determining whether or not the determination result has high reliability. In other words, the first information processing apparatus 201 compares the value of the reliability of the determination result of the acquired image which is obtained from a determination model corresponding to the determination model information 1301 with the value of the reliability reference information 1321. When the value of the reliability acquired from the determination model corresponding to the determination model information 1301 is smaller than the value of the reliability reference information 1321, the first information processing apparatus 201 acquires an image determination result from the second information processing apparatus 202. Here, the usage frequency information 1302 corresponding to the determination model may use a correct answer rate of results of determining images by the determination model.

Figure 12:
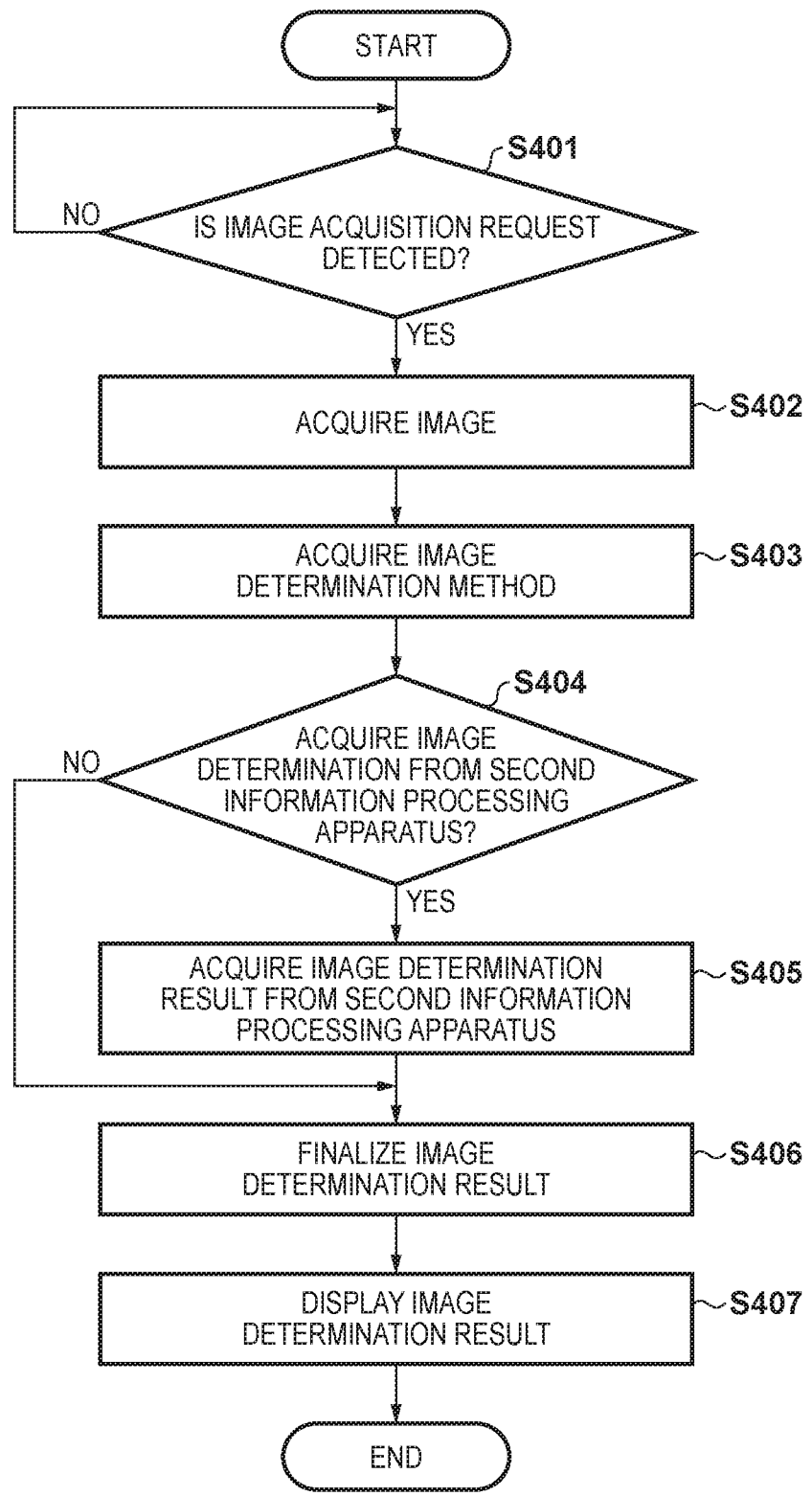
FIG. 12 is a flowchart illustrating an operation of displaying an image determination result in the first information processing apparatus.

FIG. 12 is a flowchart illustrating an operation of displaying an image determination result by the first information processing apparatus 201, in the second embodiment.

In step S401, the first information processing apparatus 201 determines whether or not an image acquisition request is detected. If an image acquisition request is detected (if the determination is YES), the process proceeds to step S402, and if an image acquisition request is not detected (if the determination is NO), the process waits in the present state.

In step S402, the first information processing apparatus 201 acquires (captures) an image.

In step S403, based on the image acquired in step S402, the first information processing apparatus 201 acquires an image determination method. The image determination method is, for example, as follows. The first information processing apparatus 201 refers to the determination model information 1301 registered in the table 1300, and determines an acquired image based on a determination model for a person, an animal, a landscape, or the like. As a result, when a determination result with high reliability is acquired, that determination result is used. On the other hand, when a determination result with high reliability cannot be obtained, a determination result is acquired by transmitting the acquired image to the second information processing apparatus 202.

In step S404, based on the information acquired in step S403, the first information processing apparatus 201 determines whether or not to acquire an image determination result from the second information processing apparatus 202. When it is determined that an image determination result is to be acquired from the second information processing apparatus 202 (when the determination is YES), the process proceeds to step S405, and when it is not determined that an image determination result is to be acquired (when the determination is NO), the process proceeds to step S406.

In step S405, the first information processing apparatus 201 acquires an image determination result from the second information processing apparatus 202 based on the image and information (meta information) such as the lens and device that captured the image, and the image capturing position.

In step S406, when the preceding step S405 is executed, the first information processing apparatus 201 overwrites and updates the image determination result based on the determination models held by the first information processing apparatus 201 with the image determination result of the second information processing apparatus 202, and finalizes the image determination result. On the other hand, when step S405 is skipped, the first information processing apparatus 201 finalizes the image determination result based on image determination results in accordance with the determination models held by the first information processing apparatus 201.

In step S407, the first information processing apparatus 201 displays the image determination result.

Figure 13:
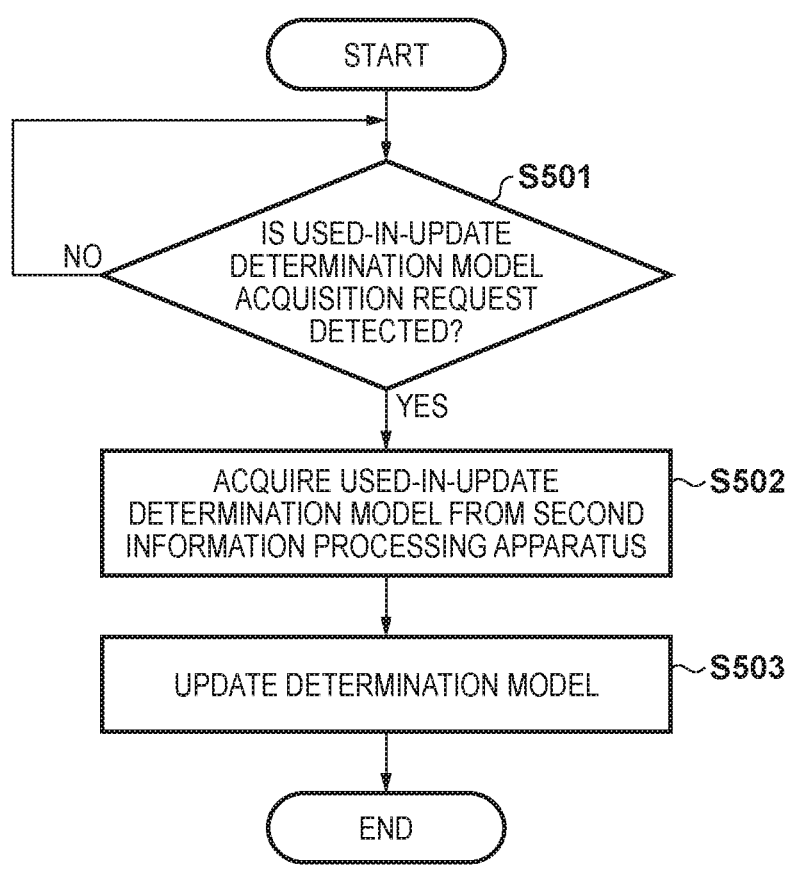
FIG. 13 is a flowchart illustrating an operation of updating a determination model in the first information processing apparatus.

FIG. 13 is a flowchart illustrating an operation of updating a determination model in the first information processing apparatus 201.

In step S501, the first information processing apparatus 201 determines whether or not a used-in-update determination model acquisition request is detected. If a used-in-update determination model acquisition request is detected (if the determination is YES), the process proceeds to step S502, and if a used-in-update determination model acquisition request is not detected (if the determination is NO), the process waits in the present state.

For example, the first information processing apparatus 201 increments the usage frequency information 1302 of the determination model used for the image determination by executing step S403 of FIG. 12. In step S501, the first information processing apparatus 201 compares the value of the usage frequency information 1302 with the value of the update reference information 1311 in the table 1310, Then, when the value of the usage frequency information 1302 has reached the value of the update reference information 1311, it is determined that there is a request to acquire a used-in-update determination model.

In step S502, in order to update the determination model whose usage frequency has reached the value of the update reference information 1311, the first information processing apparatus 201 transmits a request for acquiring a used-in-update determination model to the second information processing apparatus 202, and acquires a used-in-update determination model.

In step S503, based on the used-in-update determination model acquired in step S502, the first information processing apparatus 201 stores a new determination model. Alternatively, any of the determination models already provided is updated to a new determination model using the acquired used-in-update determination model.

Figure 14:
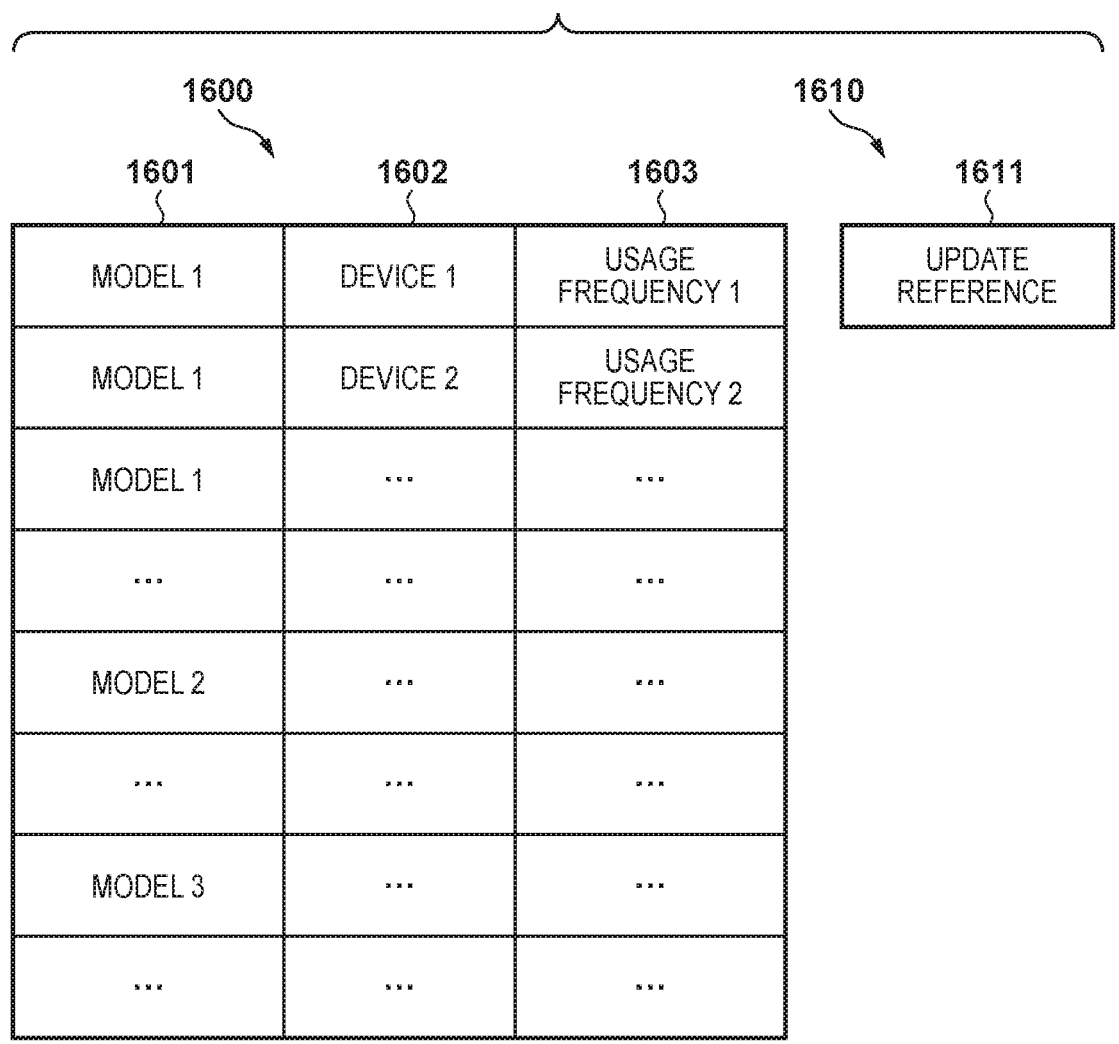
FIG. 14 is a diagram illustrating a mode of managing information of the second information processing apparatus.

FIG. 14 is a diagram illustrating an example of a management mode for storing information managed by the second information processing apparatus 202 according to the second embodiment.

A table 1600 is a table for managing a determination model stored in the second information processing apparatus 202, Determination model information 1601 is information for determining a determination model stored in the second information processing apparatus 202. Device information 1602 is information on a lens, a device, an image capturing position, and the like related to the determination model stored in the second information processing apparatus 202. Usage frequency information 1603 is information relating to the usage frequency of each determination model. A table 1610 is a table for managing an update reference for updating each determination model indicated by the determination model information 1601, The update reference information 1611 is information relating to an update reference for updating each determination model indicated by the determination model information 1601.

The second information processing apparatus 202 acquires an image from the first information processing apparatus 201, refers to the determination model information 1601 in the table 1600, and applies registered determination models to the acquired image in order based on the lens and device that captured the image, the image capturing position, and the like. Then, a subject, a scene, or the like is determined, and the result is displayed, A determination model provided in the second information processing apparatus 202 may also be updated based on the image data transmitted from the first information processing apparatus 201.

Figure 15:
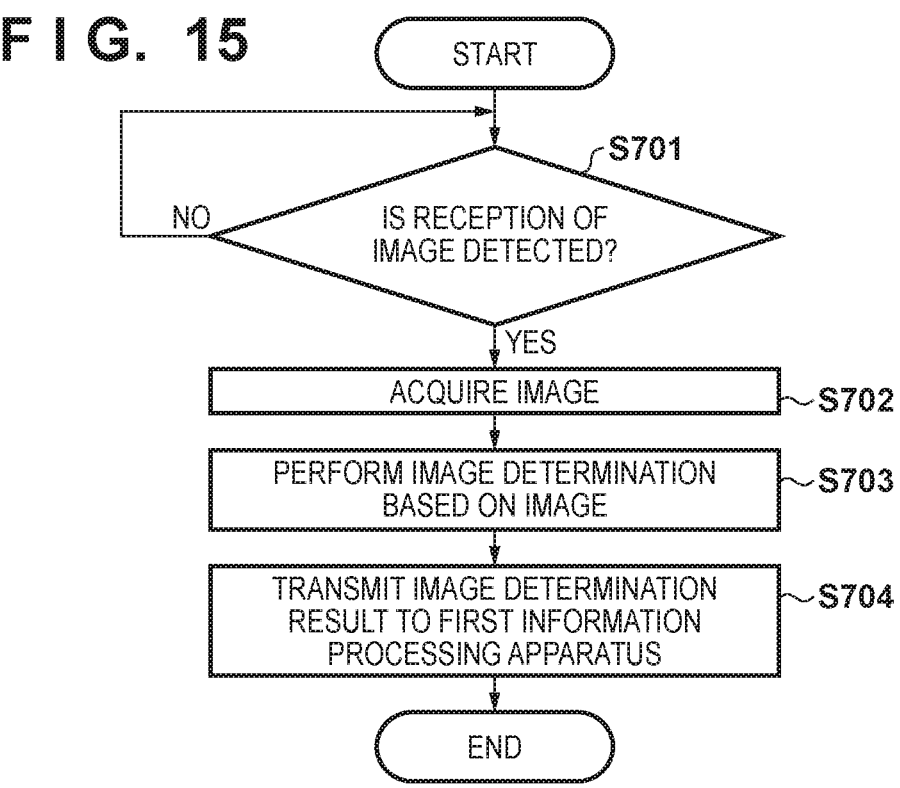
FIG. 15 is a flowchart illustrating an operation of transmitting an image determination result in the second information processing apparatus.

FIG. 15 is a flowchart illustrating an operation of acquiring an image determination result in the second information processing apparatus 202.

In step S701, the second information processing apparatus 202 determines whether or not reception of an image is detected. If image reception is detected (if the determination is YES), the process proceeds to step S702, and if image reception is not detected (if the determination is NO), the process waits in the present state. In step S702, the second information processing apparatus 202 acquires the image.

In step S703, based on the image acquired in step S702, the second information processing apparatus 202 executes an image determination. For example, the second information processing apparatus 202, based on the determination model information 1601 registered in the table 1600, and determines an acquired image by using a determination model for a person, an animal, a landscape, or the like.

In step S704, the second information processing apparatus 202 transmits the image determination result acquired in step S703 and the information of the determination models used at that time to the first information processing apparatus 201.

Figure 16:
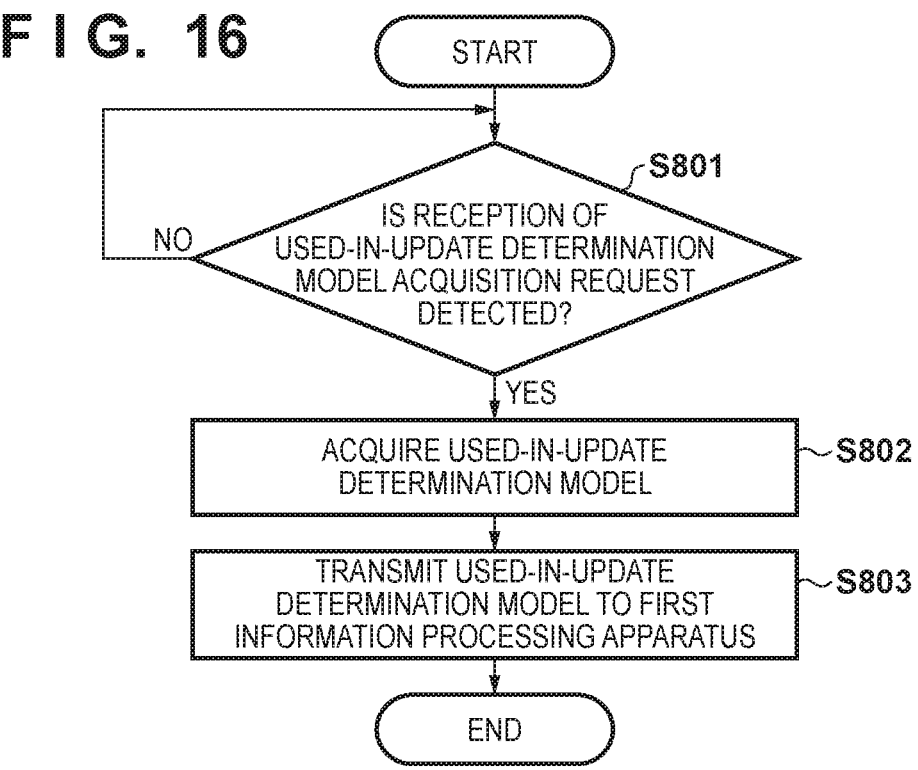
FIG. 16 is a flowchart illustrating an operation of acquiring a determination model in the second information processing apparatus.

FIG. 16 is a flow chart illustrating a method for transmitting a determination model to the first information processing apparatus 201 in the second information processing apparatus 202.

In step S801, the second information processing apparatus 202 determines whether or not a used-in-update determination model acquisition request is detected. If a used-in-update determination model acquisition request is detected (if the determination is YES), the process proceeds to step S802, and if a used-in-update determination model acquisition request is not detected (if the determination is NO), the process waits in the present state.

In step S802, the second information processing apparatus 202 acquires a used-in-update determination model to be transmitted to the first information processing apparatus 201. Specifically, the second information processing apparatus 202 refers to the table 1600 and acquires a determination model for the acquisition target based on information such as the image of the determination target, the lens and device that captured the image, the image capturing position, and the like.

In step S803, the second information processing apparatus 202 acquires a used-in-update determination model to be transmitted to the first information processing apparatus 201. At this time, the used-in-update determination model may be customized and transmitted to the first information processing apparatus 201.

As described above, according to the second embodiment, it is possible to appropriately determine content including a subject, a scene, or the like desired by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g. central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-014482, filed Jan. 30, 2019 which is hereby incorporated by reference herein in its entirety.

What is claimed is:

1. An information processing system in which a first information processing apparatus and a second information processing apparatus are configured to be communicably connected to each other in a wired or wireless manner, wherein
the first information processing apparatus comprises:
at least one first processor or circuit and a first memory storing instructions executable by the at least one first processor or circuit to function as the following units:
a content acquisition unit configured to acquire content;
a first storage unit configured to store a determination model for primary determination for determining details of the content;
a first determination unit configured to determine information included in the content using the determination model for primary determination, and output a primary determination result;
a first transmission unit configured to transmit the content to the second information processing apparatus when the primary determination result does not satisfy a predetermined condition;
a decision unit configured to receive a secondary determination result from the second information processing apparatus and decide a final determination result based on at least one of the primary determination result and the secondary determination result; and
a determination model acquisition unit for acquiring a used-in-update determination model for updating the determination model for primary determination when a usage frequency of a determination model used for secondary determination exceeds a predetermined frequency, and the second information processing apparatus comprises:
at least one second processor or circuit and a second memory storing instructions executable by the at least one second processor or circuit to function as the following units:
a content reception unit configured to receive the content transmitted from the first information processing apparatus;
a second storage unit configured to store the determination model used for secondary determination for determining details of the content;
a second determination unit configured to determine information included in the content using the determination model used for secondary determination, and output the secondary determination result; and
a second transmission unit configured to transmit the secondary determination result to the first information processing apparatus;
the determination model acquisition unit acquires, from the second information processing apparatus, the determination model used for secondary determination whose usage frequency exceeds the predetermined frequency as the used-in-update determination model.

2. The information processing system according to claim 1, wherein the determination model used for secondary determination is capable of determining information included in the content with higher accuracy than the determination model for primary determination.

3. The information processing system according to claim 1, wherein the second storage unit has a storage capacity that is larger than a storage capacity of the first storage unit.

4. The information processing system according to claim 1, wherein the first information processing apparatus is a terminal apparatus and the second information processing apparatus is a server apparatus.

5. The information processing system according to claim 1, wherein the first transmission unit transmits content to the second information processing apparatus when a reliability of the primary determination result is less than a predetermined reference value.

6. The information processing system according to claim 1, wherein the first transmission unit changes an interval of transmitting the content to the second information processing apparatus in accordance with at least one of a communication environment of the first information processing apparatus and the second information processing apparatus, and processing capabilities and storage capacities of the first and second information processing apparatuses.

7. The information processing system according to claim 1, wherein the first transmission unit transmits content to the second information processing apparatus when a score of the primary determination result is less than a reference value.

8. The information processing system according to claim 1, wherein the second information processing apparatus changes the determination model used for secondary determination by the second determination unit based on meta information of an image acquired from the first information processing apparatus.

9. The information processing system according to claim 8, wherein the meta information includes at least one of information of a lens that captured the image, information of a device that captured the image, and information of a position at which the image was captured.

10. The information processing system according to claim 1, wherein the content is an image or a moving image.

11. The information processing system according to claim 1, wherein the content acquisition unit is an image capturing apparatus.

12. The information processing system according to claim 1, wherein the first and second determination units determine information included in the content by performing subject analysis.

13. The information processing system according to claim 1, wherein the first and second determination units determine information included in the content by performing scene analysis.

14. The information processing system according to claim 1, wherein the first and second determination units determine information included in the content by performing aesthetic analysis.

15. The information processing system according to claim 1, wherein the second information processing apparatus, when transmitting the secondary determination result acquired by the second determination unit to the first information processing apparatus, additionally transmits information on a usage frequency of the determination model used for secondary determination by the second determination unit.

16. An information processing system in which a first information processing apparatus and a second information processing apparatus are configured to be communicably connected to each other in a wired or wireless manner, wherein
the first information processing apparatus comprises:
at least one first processor or circuit and a first memory storing instructions executable by the at least one first processor or circuit to function as the following units:
a content acquisition unit configured to acquire content;
a first storage unit configured to store a determination model for primary determination for determining details of the content;
a first determination unit configured to determine information included in the content using the determination model for primary determination, and output a primary determination result;
a first transmission unit configured to transmit the content to the second information processing apparatus; and
a decision unit configured to receive a secondary determination result from the second information processing apparatus and decide a final determination result based on at least one of the primary determination result and the secondary determination result; and
a determination model acquisition unit for acquiring a used-in-update determination model for updating the determination model for primary determination, and
the second information processing apparatus comprises:
at least one second processor or circuit and a second memory storing instructions executable by the at least one second processor or circuit to function as the following units:
a content reception unit configured to receive the content transmitted from the first information processing apparatus;
a second storage unit configured to store a determination model used for secondary determination for determining details of the content;
a second determination unit configured to determine information included in the content using the determination model used for secondary determination, and output the secondary determination result; and a second transmission unit configured to transmit the secondary determination result to the first information processing apparatus, and wherein the decision unit compares the primary determination result and the secondary determination result, and if the determination results are the same, the primary determination result is set as the final determination result, and if the determination results differs, the secondary determination result is set as the final determination result, the determination model acquisition unit acquires, from the second information processing apparatus, the determination model used for secondary determination as the used-in-update determination model when (1) the primary determination result has a predetermined ratio of errors within a certain period of time, or (2) the primary determination result and the secondary determination result are different from each other, even if a score of the primary determination result is equal to or greater than a reference value.

17. A method of controlling a terminal apparatus used in an information processing system in which the terminal apparatus and a server apparatus are configured to be communicably connected to each other in a wired or wireless manner, the method comprising:

acquiring content;

storing a determination model for primary determination for determining details of the content;

determining information included in the content using the determination model for primary determination, and outputting a primary determination result;

transmitting the content to the server apparatus when the primary determination result does not satisfy a predetermined condition;

receiving from the server apparatus a secondary determination result in which is determined information included in the content by the server apparatus, and deciding a final determination result based on at least one of the primary determination result and the secondary determination result;

acquiring a used-in-update determination model for updating the determination model for primary determination when a usage frequency of a determination model used for secondary determination exceeds a predetermined frequency; and acquiring, from the server apparatus, the determination model used for secondary determination whose usage frequency exceeds the predetermined frequency as the used-in-update determination model.

18. A method of controlling a terminal apparatus used in an information processing system in which the terminal apparatus and a server apparatus are configured to be communicably connected to each other in a wired or wireless manner, the method comprising:

acquiring content;

storing a determination model for primary determination for determining details of the content;

determining information included in the content using the determination model for primary determination, and outputting a primary determination result;

transmitting the content to the server apparatus;

receiving from the server apparatus a secondary determination result in which is determined information included in the content by the server apparatus, and deciding a final determination result based on at least one of the primary determination result and the secondary determination result; and acquiring a used-in-update determination model for updating the determination model for primary determination, wherein in the deciding, the primary determination result and the secondary determination result are compared, and if the determination results are the same, the primary determination result is set as the final determination result, and if the determination results differs, the secondary determination result is set as the final determination result, and wherein in the acquiring, from the server apparatus, a determination model used for secondary determination as the used-in-update determination model is acquired when (1) the primary determination result has a predetermined ratio of errors within a certain period of time, or (2) the primary determination result and the secondary determination result are different from each other, even if a score of the primary determination result is equal to or greater than a reference value.

19. A non-transitory computer-readable storage medium storing a program for causing a computer to execute each step of a method of controlling a terminal apparatus used in an information processing system in which the terminal apparatus and a server apparatus are configured to be communicably connected to each other in a wired or wireless manner, the method comprising:

acquiring content;

storing a determination model for primary determination for determining details of the content;

determining information included in the content using the determination model for primary determination, and outputting a primary determination result;

transmitting the content to the server apparatus when the primary determination result does not satisfy a predetermined condition;

receiving from the server apparatus a secondary determination result in which is determined information included in the content by the server apparatus, and deciding a final determination result based on at least one of the primary determination result and the secondary determination result;

acquiring a used-in-update determination model for updating the determination model for primary determination when a usage frequency of a determination model used for secondary determination exceeds a predetermined frequency; and acquiring, from the server apparatus, the determination model used for secondary determination whose usage frequency exceeds the predetermined frequency as the used-in-update determination model.

20. A non-transitory computer-readable storage medium storing a program for causing a computer to execute each step of a method of controlling a terminal apparatus used in an information processing system in which the terminal apparatus and a server apparatus are configured to be communicably connected to each other in a wired or wireless manner, the method comprising:

acquiring content;

storing a determination model for primary determination for determining details of the content;

determining information included in the content using the determination model for primary determination, and outputting a primary determination result;

transmitting the content to the server apparatus;

receiving from the server apparatus a secondary determination result in which is determined information included in the content by the server apparatus, and deciding a final determination result based on at least one of the primary determination result and the secondary determination result; and acquiring a used-in-update determination model for updating the determination model for primary determination, wherein in the deciding, the primary determination result and the secondary determination result are compared, and if the determination results are the same, the primary determination result is set as the final determination result, and if the determination results differs, the secondary determination result is set as the final determination result, and wherein in the acquiring, from the server apparatus, a determination model used for secondary determination as the used-in-update determination model is acquired when (1) the primary determination result has a predetermined ratio of errors within a certain period of time, or (2) the primary determination result and the secondary determination result are different from each other, even if a score of the primary determination result is equal to or greater than a reference value.

21. A terminal apparatus used in an information processing system in which the terminal apparatus and a server apparatus are configured to be communicably connected to each other in a wired or wireless manner, the terminal apparatus comprising:

at least one processor or circuit and a memory storing instructions executable by the at least one processor or circuit to function as the following units:

a content acquisition unit configured to acquire content;

a storage unit configured to store a determination model for primary determination for determining details of the content;

a determination unit configured to determine information included in the content using the determination model for primary determination, and output a primary determination result;

a transmission unit configured to transmit the content to the server apparatus when the primary determination result does not satisfy a predetermined condition;

a decision unit configured to receive from the server apparatus a secondary determination result in which is determined information included in the content by the server apparatus, and decide a final determination result based on at least one of the primary determination result and the secondary determination result; and a determination model acquisition unit for acquiring a used-in-update determination model for updating the determination model for primary determination when a usage frequency of a determination model used for secondary determination exceeds a predetermined frequency;

wherein the determination model acquisition unit acquires, from the server apparatus, the determination model used for secondary determination model whose usage frequency exceeds the predetermined frequency as the used-in-update determination model.

22. The terminal apparatus according to claim 21, wherein the transmission unit transmits content to the server apparatus when a score of the primary determination result is less than a reference value.

23. A terminal apparatus used in an information processing system in which the terminal apparatus and a server apparatus are configured to be communicably connected to each other in a wired or wireless manner, the terminal apparatus comprising:

at least one processor or circuit and a memory storing instructions executable by the at least one processor or circuit to function as the following units:

a content acquisition unit configured to acquire content;

a storage unit configured to store a determination model for primary determination for determining details of the content;

a determination unit configured to determine information included in the content using the determination model for primary determination, and output a primary determination result;

a transmission unit configured to transmit the content to the server apparatus;

a decision unit configured to receive from the server apparatus a secondary determination result in which is determined information included in the content by the server apparatus, and decide a final determination result based on at least one of the primary determination result and the secondary determination result; and a determination model acquisition unit for acquiring a used-in-update determination model for updating the determination model for primary determination, wherein the decision unit compares the primary determination result and the secondary determination result, and if the determination results are the same, the primary determination result is set as the final determination result, and if the determination results differs, the secondary determination result is set as the final determination result, and the determination model acquisition unit acquires, from the server apparatus, a determination model used for secondary determination as the used-in-update determination model when (1) the primary determination result has a predetermined ratio of errors within a certain period of time, or (2) the primary determination result and the secondary determination result are different from each other, even if a score of the primary determination result is equal to or greater than a reference value.

* * * * *